United States Patent [19]
Katagiri

[11] Patent Number: 5,552,609
[45] Date of Patent: Sep. 3, 1996

[54] ELECTRIC-COOLED TYPE SEMICONDUCTOR RADIOACTIVE RAY DETECTOR

[75] Inventor: Masaki Katagiri, Ibaraki-ken, Japan

[73] Assignee: Japan Atomic Energy Research Institute, Tokyo, Japan

[21] Appl. No.: 302,405

[22] Filed: Sep. 8, 1994

[30] Foreign Application Priority Data

Sep. 9, 1993 [JP] Japan .................................. 5-224636

[51] Int. Cl.$^6$ .............................. G01T 1/24; G12B 15/02
[52] U.S. Cl. ...................................... 250/370.15; 250/352
[58] Field of Search ................................ 250/370.15, 352

[56] References Cited

U.S. PATENT DOCUMENTS 5,157,255  10/1992  Kornrumpf et al. ................ 250/252.1

FOREIGN PATENT DOCUMENTS 1-250026  10/1989  Japan .................................... 250/352

OTHER PUBLICATIONS

"Operational Characteristics Of A High Purity Germanium Photon Spectrometer Cooled By A Closed–Cycle Cryogenic Refrigerator," Marler, J. M., et al. (Space Technology Products, G.E. Electric Co., Phila. Pa), *Nuclear Science*, vol. NS–20, No. 1, Feb. 1973, pp. 522–527.

"Performance Of A High–Purity Ge Gamma–Ray Spectrometer System Using A Closed–Cycle Cryogenic Refrigerator," Sakai, Eiji, et al. (Japan Atomic Energy Research Inst., Tokaimura, Japan), *IEEE Transactions on Nuclear Science*, vol. NS–29, No. 1, Feb. 1982, pp. 760–763.

"Performance of a Gamma–Ray and X–Ray Spectrometer Utilizing Germanium and Si(Li) Detectors Cooled by a Closed–Cycle Cryogenic Mechanical Refrigerator," Stone, R. E., et al. (EG&G ORTEC, Oak Ridge, TN), *IEEE Transactions on Nuclear Science*, vol. 33, No. 1, Feb. 1986. pp. 299–302.

*Primary Examiner*—Constantine Hannaher
*Attorney, Agent, or Firm*—Banner & Allegretti, Ltd.

[57] ABSTRACT

A miniatured semiconductor radioactive ray detector which has an energy resolution substantially equivalent to that of a conventional semiconductor radioactive ray detector without use of liquid nitrogen and is simple as well as readily portable is disclosed. A Stirling type electric refrigerator is provided for cooling the semiconductor radioactive ray detecting element to the temperature near to a cryogenic temperature of liquid nitrogen. The first stage amplification circuit of the signal preamplifier for amplifying the detected signal relating to the radioactive ray and the signal line as well as circuit wiring are covered and molded by a fibrous material having gas permeability and electric insulation properties so as to reduce microphonics which are likely to be generated due to the electric refrigerator. The compression pump associated with the electric refrigerator is fixed to the support base by way of the vibration absorbing material which absorbs the vibration caused by the compression pump. A circuit for reducing the microphonics is provided at the input stage of the main signal amplifier.

14 Claims, 17 Drawing Sheets

Fig. 6
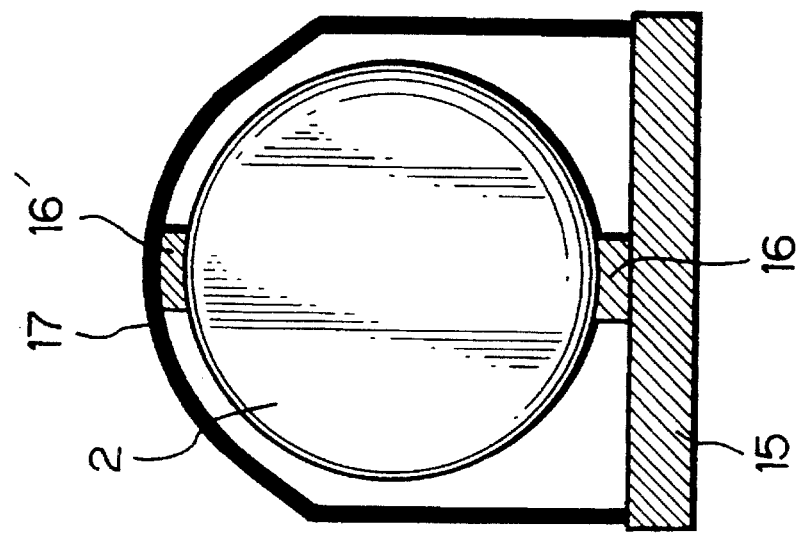
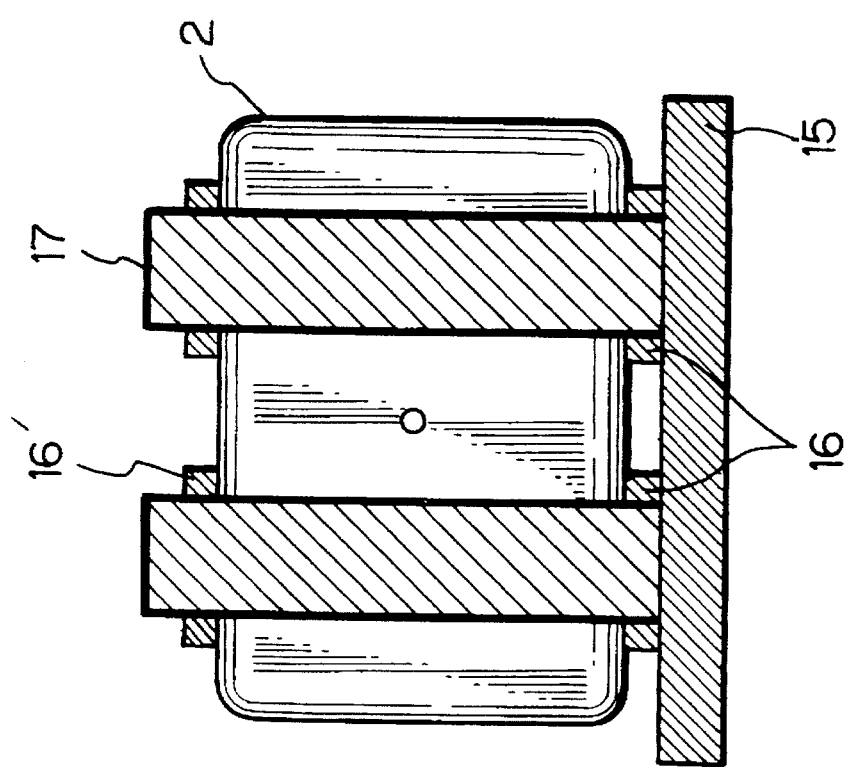

ELECTRIC-COOLED TYPE SEMICONDUCTOR RADIOACTIVE RAY DETECTOR

BACKGROUND OF THE INVENTION

1. Field of the Invention

The present invention relates to a semiconductor radioactive ray detector for use in detection of such radioactive rays as X-rays or gamma rays by cooling the detector element to a cryogenic temperature near to that of liquid nitrogen (77K) and more particularly to a semiconductor radioactive ray detector which uses electricity instead of liquid nitrogen which has been conventionally used for cooling the detector element. The semiconductor radioactive ray detector of the present invention can be widely applied not only in measurement of such radioactive rays as gamma rays, X-rays or the like in nuclear reactor associated facilities but also in the field of radioactive ray measurement for nuclear physics, astrophysics, nuclear chemistry, etc.

2. Prior Art

FIG. 1 illustrates a liquid nitrogen cooled type semiconductor radioactive ray detector which has been conventionally used. In FIG. 1, numeral 101 designates a semiconductor radioactive detecting element, numeral 102 a cooling vessel, numeral 103 liquid nitrogen, numeral 104 a cooling rod, numeral 105 a semiconductor radioactive ray detector vessel and numeral 106 a signal preamplifier. As shown in FIG. 1, according to the semiconductor radioactive ray detector which has hithertofore been used, the semiconductor radioactive ray detector element 101 (such as Ge detecting element, Si detecting element or the like) has been cooled by using the cooling vessel 102 containing liquid nitrogen 103. Since liquid nitrogen is required to be used, it has to be made available before use, which has made it difficult to use such a detector readily and limited the place of where such a detector is used. Besides, since the cooling vessel 102 has to be used, miniaturization of such a detector as a whole has been difficult.

Consequently, an electric-cooled semiconductor radioactive ray detector has been developed, the detector using a closed-cycle He refrigerator for cooling the semiconductor radioactive detecting element.

FIG. 2 illustrates an electric-cooled semiconductor radioactive ray detector using such a closed-cycle He refrigerator. In FIG. 2, the same reference numerals as those used in FIG. 1 designate the same elements as those designated by the corresponding numerals in FIG. 1. In FIG. 2, reference numeral 107 designates a compressor for the closed-cycle refrigerator, numeral 108 a pipe, numeral 109 a cooling mechanism for the closed-cycle refrigerator which utilizes a Solvay cooling mechanism or the like, numeral 110 a cooler part, and numeral 111 cushioning member, respectively. In case of the electric-cooled semiconductor radioactive ray detector as shown in FIG. 2, it was difficult to make this semiconductor radioactive ray detector portable, because it is difficult to make the closed-cycle He refrigerator miniaturized and this refrigerator was also so heavy. Furthermore, in the case of the closed-cycle He refrigerator, microphonics is generated by the vibrational noise generated at the cooler part 110. Microphonics are causes of degradation of the energy resolution. Since frequency band of the microphonics thus generated is expanded originating in the cooling method to the frequency band close to that of the radioactive ray signals, it was difficult to remove such microphonics only by means of signal processing technology. Accordingly, a cushioning member 111 such as a vibration absorbing material or the like adapted to absorb vibrational noise was interposed between the semiconductor radioactive detecting element 101 and the cooler part 110 so as to remove the influence of microphonics. Since such a cushioning member 111 as a vibration absorbing material or the like has to be used and the cooling capacity of the refrigerator has to be secured for cooling of the semiconductor radioactive ray detecting element 101 and compensation for the loss due to the cushioning member 111 such as a vibration absorbing material or the like, a large cooling capacity has to be provided, which also made it difficult for the refrigerator to be miniaturized.

SUMMARY OF THE INVENTION

Accordingly, an object of the present invention is to provide a small sized semiconductor radioactive ray detector without use of liquid nitrogen which overcomes the drawbacks of prior arts relating to the cooling method and microphonics, provides almost equivalent energy resolution to that of a conventional semiconductor radioactive detector and is convenient to use as well as being portable.

In order to attain the objects as above mentioned, an electric-cooled radioactive ray detector according to the present invention comprises a vacuum vessel, a semiconductor radioactive detecting means disposed in said vacuum vessel, an electrical cooling means mechanically coupled to said semiconductor radioactive ray detecting means and including a Stirling type electric refrigerator for cooling by cyclic operation, and a microphonics reducing means for passing therethrough signals relating to the detected radioactive rays and reducing the microphonics so as to prevent microphonics generated by the semiconductor radioactive ray detecting means as a result of said Stirling type electric refrigerator from having an adverse influence on the energy resolution.

According to such a constitution, since the Stirling type electric refrigerator cools by the cyclic operation the semiconductor radioactive ray detecting means to cool it to a cryogenic temperature close to that of liquid nitrogen, major microphonics caused by semiconductor radioactive ray detecting means comprise frequency components less than 10 kHz which is sufficiently low compared to the frequency generation component (for example, in the order to MHz) of the signals relative to the radioactive rays to be detected, such that the generated microphonics can be reduced by the microphonics reducing means. In the meantime, since the radioactive ray signals are not reduced, by the microphonics reducing means, degradation of the energy resolution of the semiconductor radioactive ray detector can be prevented and equivalent energy resolution to that of a conventional semiconductor radioactive ray detector can be attained.

In order to attain the object as above mentioned, a further electric-cooled semiconductor radioactive ray detector comprises a vacuum vessel, a semiconductor radioactive ray detecting means disposed in said vacuum vessel, and including a semiconductor radioactive ray detector, an amplification means for amplifying the signals generated from said semiconductor radioactive ray detector, a signal take-out means for taking out of said vacuum vessel such signals as are amplified by said amplification means, and a circuit wiring means for feeding power to and controlling said semiconductor radioactive ray detecting means, with said amplification means, said signal take-out means and said circuit wiring means being covered and molded by a fibrous material having gas permeability and electric insulating property, and an electrically cooling means mechanically coupled to said semiconductor radioactive ray detecting means and including a Stirling type electric refrigerator for cooling by cyclic operation.

According to such a constitution, since the Stirling type electric refrigerator cools the semiconductor radioactive ray detecting means by the cyclic operation to cool it to a cryogenic temperature close to that of the liquid nitrogen, the frequency component of major microphonics generated by the semiconductor radioactive detecting means is less than 10 kHz which is sufficiently low compared to the frequency generation component (for example, in the order of MHz) of signals relative to the radioactive rays to be detected. In addition, since the amplification means, the signal take-out means and the circuit wiring means are covered and molded by fibrous material having gas permeability and electric insulating properties. The vibration at the inlet stage of said amplification means is suppressed so that a subtle variation in the stray capacity at the inlet stage which is the main cause for microphonics can be removed. Accordingly, microphonics can be reduced and an equivalent energy resolution to the one obtained by a conventional semiconductor radioactive ray detector may be attained.

Accordingly, the electric-cooled semiconductor radioactive detector according to the present invention has made it possible for the semiconductor radioactive ray detector which has been cooled by use of liquid nitrogen to be electrically cooled and used without degrading the inherent performance. As a consequence, the electric-cooled semiconductor radioactive ray detector makes it possible for a radioactive ray detector to be used at such a place where liquid nitrogen is difficult to be obtained. Besides, although maintenance of an apparatus requiring periodic filling with liquid nitrogen was cumbersome, such a maintenance can be made easily according to the present invention. Furthermore, since the semiconductor radioactive ray detector has been miniaturized and as the consequence battery drive has been made possible by use of an invertor, measurement of radioactive rays outside a building, measurement test of radioactive rays which was difficult because of assembly limitation due to the semiconductor radioactive ray detector being very large, and use of the semiconductor radioactive ray detector in a radioactive ray instrumentation in a nuclear reactor facility owing to easy maintenance have been made possible.

These and additional objects and advantages will become apparent upon reading the following description of the present invention in conjunction with the accompanying drawings.

BRIEF DESCRIPTION OF THE DRAWINGS

FIG. 6 illustrates in detail one of the compression pump fixing mechanisms which fixes a compression pump 2 of the electric-cooled semiconductor radioactive ray detector according to the present invention shown in FIG. 3, to the support base 15 by way of vibration absorbing material 16;

DETAILED DESCRIPTION OF THE PREFERRED EMBODIMENTS

Figure 1:
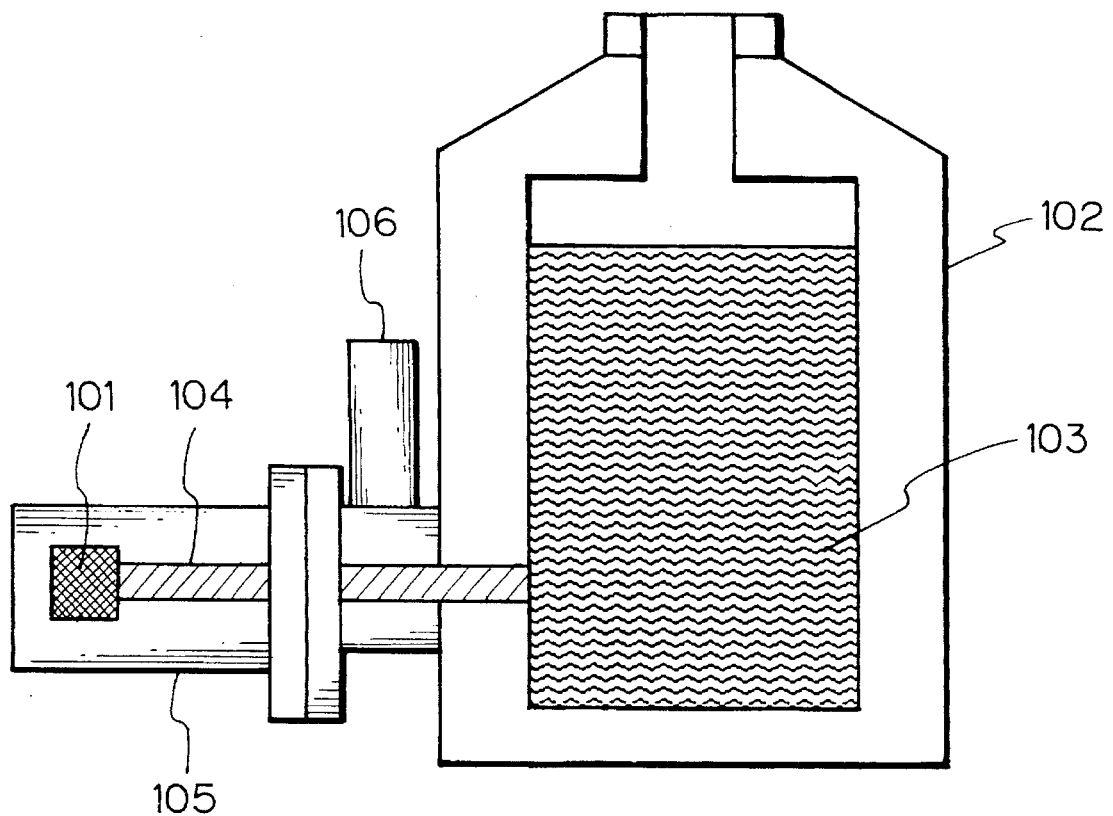
FIG. 1 illustrates a liquid nitrogen cooled semiconductor radioactive ray detector according to a prior art.
Figure 2:
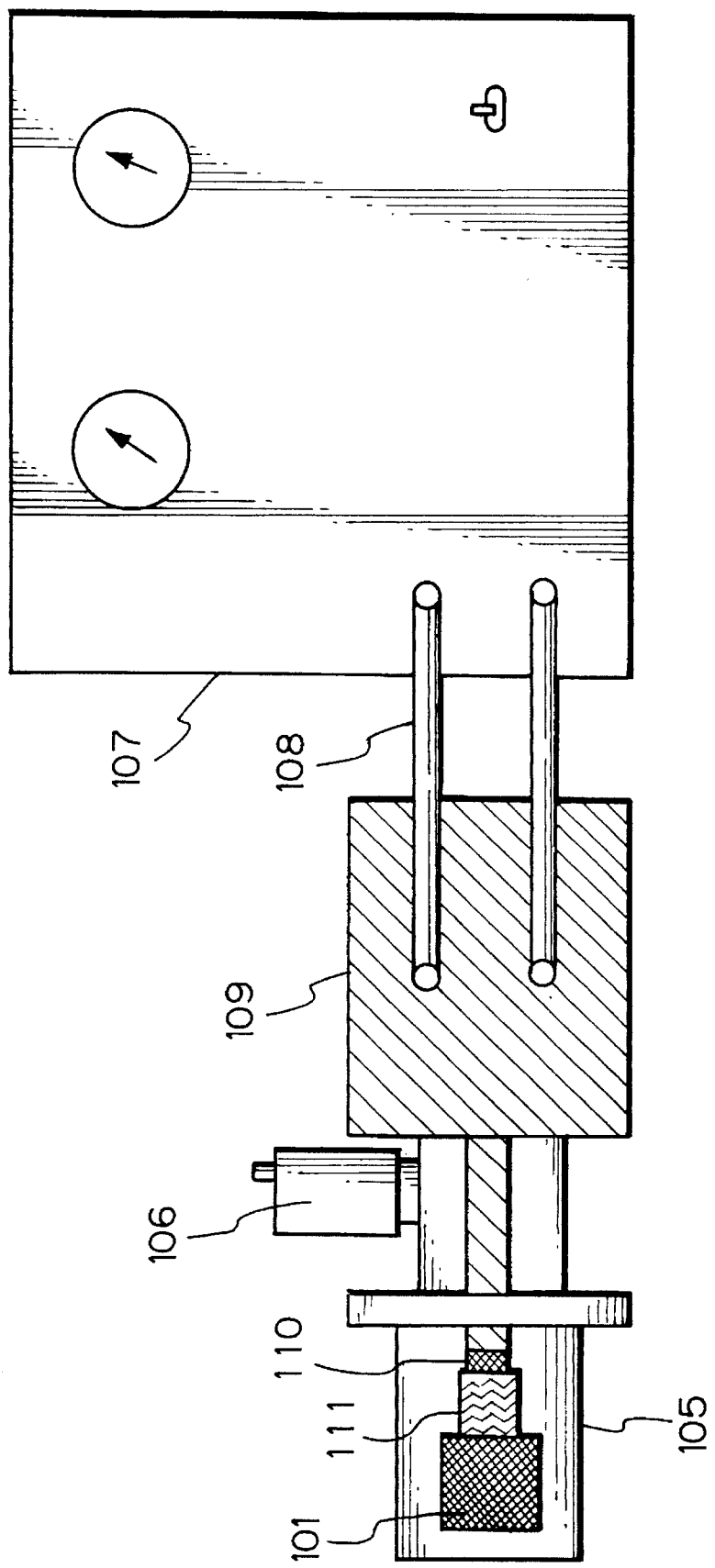
FIG. 2 illustrates an electric-cooled semiconductor radioactive ray detector according to a prior art using a closed cycle He refrigerator.
Figure 3:
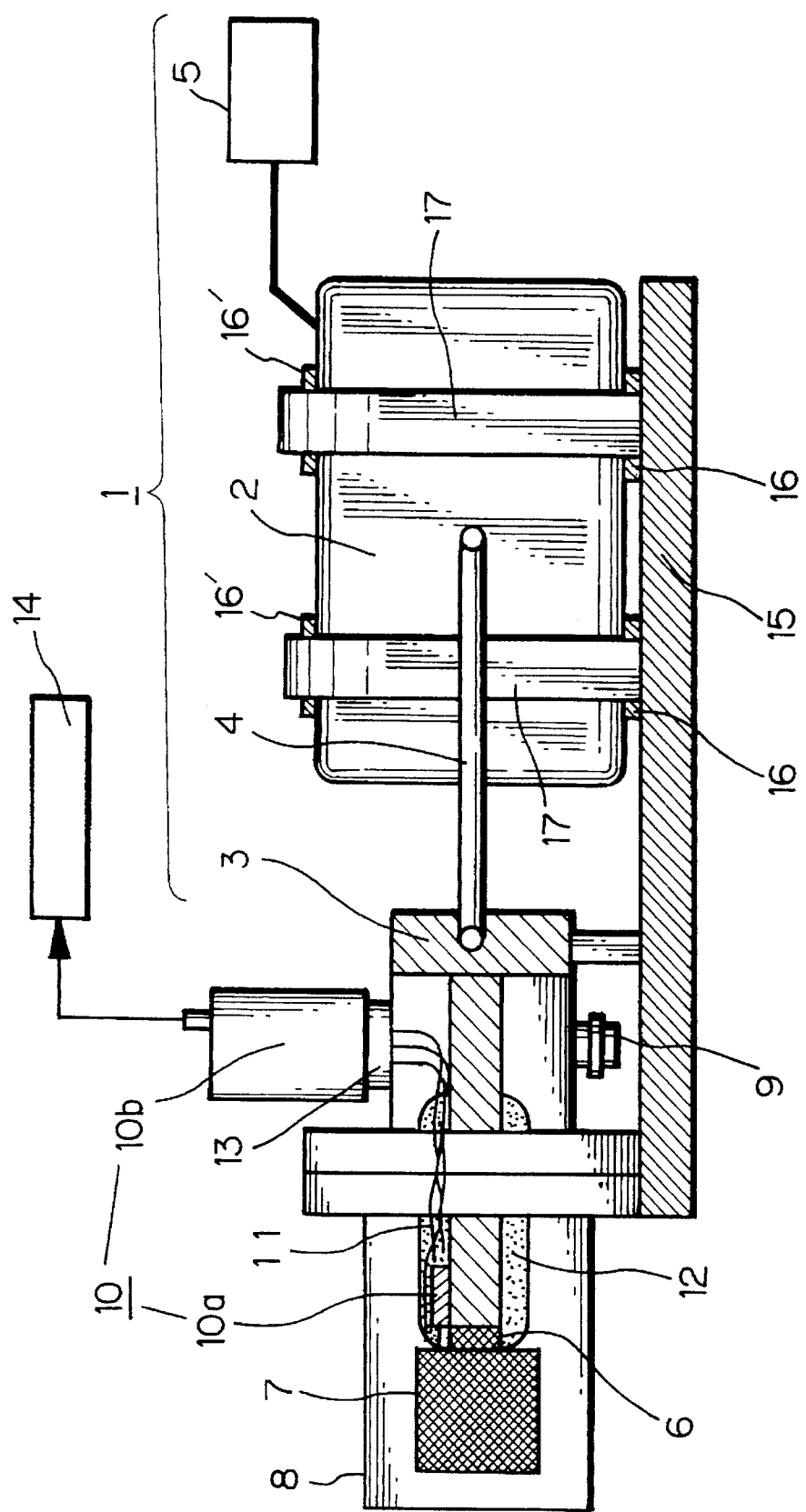
FIG. 3 illustrates the construction of an embodiment of an electric-cooled semiconductor radioactive ray detector according to the present invention.

FIG. 3 illustrates the structure of an embodiment of the electric-cooled semiconductor radioactive ray detector according to the present invention. In FIG. 3, numeral 1 designates an electric refrigerator, numeral 2 a compression pump for cooling, numeral 3 a Stirling cycle cooling mechanism, numeral 4 a connection tube, numeral 5 a drive power supply, numeral 6 a cooling section, numeral 7 a semiconductor radioactive ray detecting element, numeral 8 a vacuum vessel, numeral 9 a vacuum valve, numeral 10 a preamplifier for signals, numeral 10a the first stage amplification circuit thereof, numeral 10b the rear stage amplification circuit thereof, numeral 11 a signal line and a circuit wiring for feeding powers to and controlling semiconductor radioactive ray detecting element 7, etc., numeral 12 a fibrous material having gas permeability and electric insulation property, numeral 13 a hermetic seal member, numeral 14 a main signal amplifier, numeral 15 a support base, numerals 16 and 16' a vibration absorbing material and numeral 17 a fixing jig. The present detector employs a Stirling type electric refrigerator 1 in place of a conventional liquid nitrogen cooler for cooling the detecting element to the cryogenic temperature of liquid nitrogen. The electric refrigerator 1 comprises the compression pump 2, the connection tube 4, the Stirling type cooling mechanism 3 and the drive power supply 5 either of variable power supply voltage type or variable frequency type or both types. Gas, such as Helium gas generated by the compression pump 2 driven by AC voltage supplied from the drive power supply 5 is fed by way of the connection tube 4 to the Stirling cycle cooling mechanism 3, where the displacer is caused by the gas to reciprocate to cool the cooling section 6 to the cryogenic temperature of liquid nitrogen. The cooling section 6 is mechanically connected directly to the Stirling cycle cooling mechanism 6. The semiconductor radioactive ray detecting element 7 is directly attached to the cooling section 6. In the vicinity of the attached semiconductor radioactive ray detecting element 7, the first stage amplification circuit 10a of the signal preamplifier 10 is located. The signal line and circuit wiring 11 are conducted to the rear stage circuit 10b of the signal preamplifier 10 disposed externally of the vacuum vessel 8 by way of the hermetic seal member 13. Accordingly, the signals of the radioactive rays detected by the semiconductor radioactive detecting element 7 are amplified by the first stage amplification circuit 10a of the signal preamplifier 10 and forwarded to the rear stage circuit 10b of the signal preamplifier 10 by way of the signal line out of the signal line and circuit wiring 11. The signals are further amplified in the rear stage circuit 10b. After a high vacuum is generated in the vacuum vessel 8 by evacuating the vacuum vessel 8 which is used to place the Stirling cycle cooling mechanism 3 and the semiconductor radioactive ray detecting element 7 under vacuum, the vacuum vessel 8 is sealed by the vacuum valve 9. The vacuum pump 2 is indirectly fixed to the support base 15 by way of the vibration absorbing material 16 while the vacuum vessel 8 along with the Stirling cycle cooling mechanism 3 is directly fixed to the support base 15. After the vacuum is enclosed and when the drive power supply 5 supplies AC power, the Stirling type electric refrigerator 1 starts to cool. After lapse of the cooling time determined substantially by the cooling capacity, the weight of the semiconductor detecting element and the rate of heat intrusion in the cooling section, the semiconductor radioactive ray detecting element 7 is cooled to the operating temperature near to the cryogenic temperature of liquid nitrogen.

After the liquid nitrogen temperature has been reached, when a bias voltage is applied to the semiconductor radioactive ray detecting element 7, the semiconductor radioactive ray detecting element 7, as radioactive rays are incident, serve to detect the radioactive rays and generate signals relating to said radioactive rays. The radioactive ray signals thus generated are received by the signal preamplifier 10 and filtered by the main signal amplifier 14 with a time constant of about 1 microsecond, whereby filtered signals are amplified to provide radioactive ray pulse signals.

Figure 4:
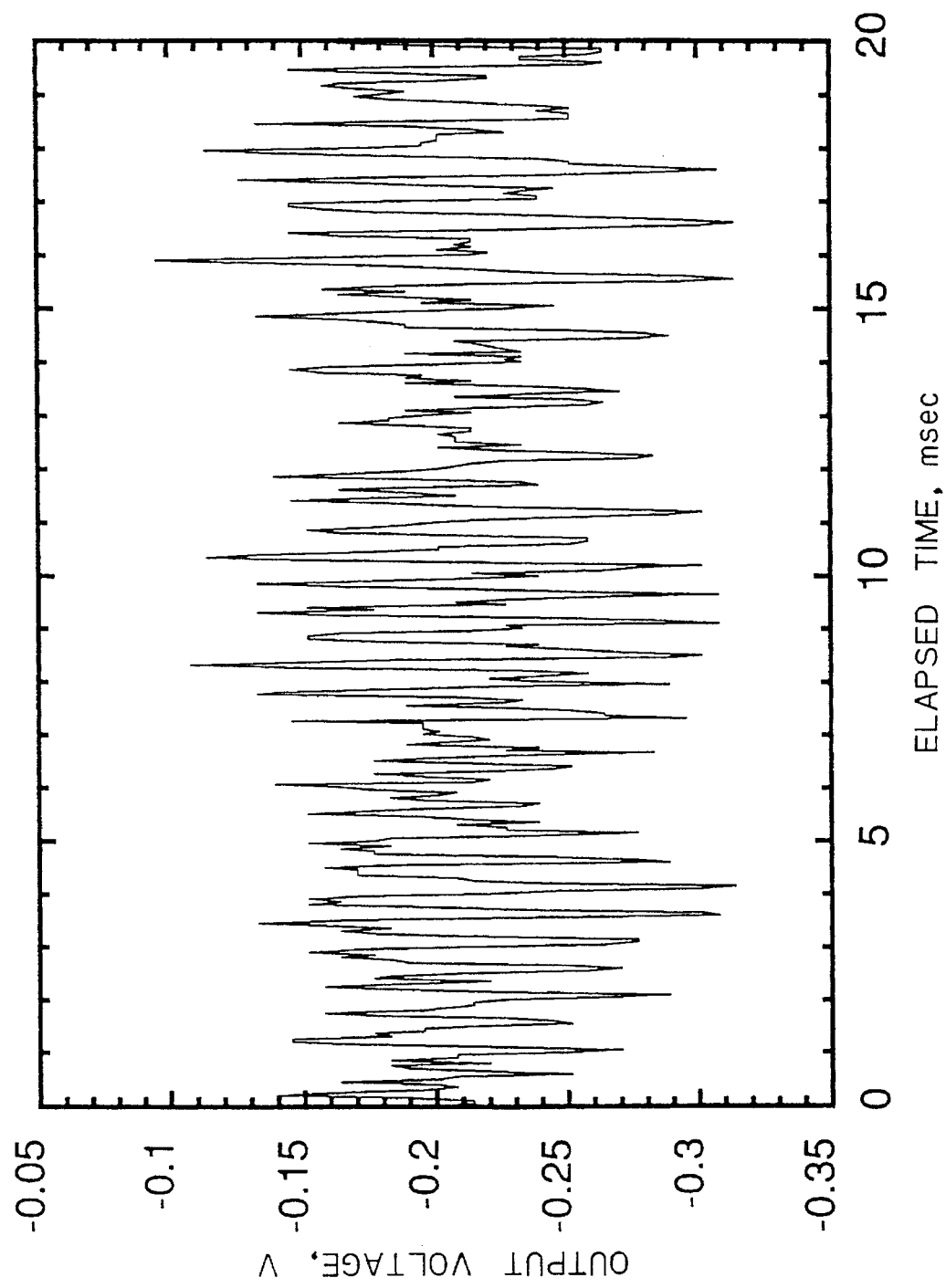
FIG. 4 illustrates the wave forms of the output signals from a preamplifier of the semiconductor radioactive ray detector according to the present invention which uses a Stirling type electric refrigerator.

FIG. 4 illustrates the wave forms of the output signals from the preamplifier 10 of the semiconductor radioactive ray detector according to the present invention which employs the Stirling type electric refrigerator 1 as the cooling means. The microphonics which is generated due to vibration of the displacer in the Stirling cycle cooling mechanism 3 in the Stirling type electric refrigerator 1 give in general adverse affect on the signals relating to radioactive rays and degrade the energy resolution. However, according to the present invention, in consideration of the fact that the driving manner of the Stirling cycle cooling mechanism 3 is cyclic such that the vibration of the displacer provides standing waves as shown in FIG. 4, major microphonics generated from the semiconductor radioactive ray detecting element 7 attached to the low temperature cooling section 6 provided at the tip end of the electric refrigerator 1 contain frequency component which is sufficiently low, such as less than 10 Khz compared to the frequency component of the signals relating to radioactive rays. If the major microphonics contain a frequency component less than 10 kHz, the microphonics reducing circuit which is a filter circuit to be explained in the rear stage main signal amplifier 14 can prevent degradation of energy resolution.

Figure 5:
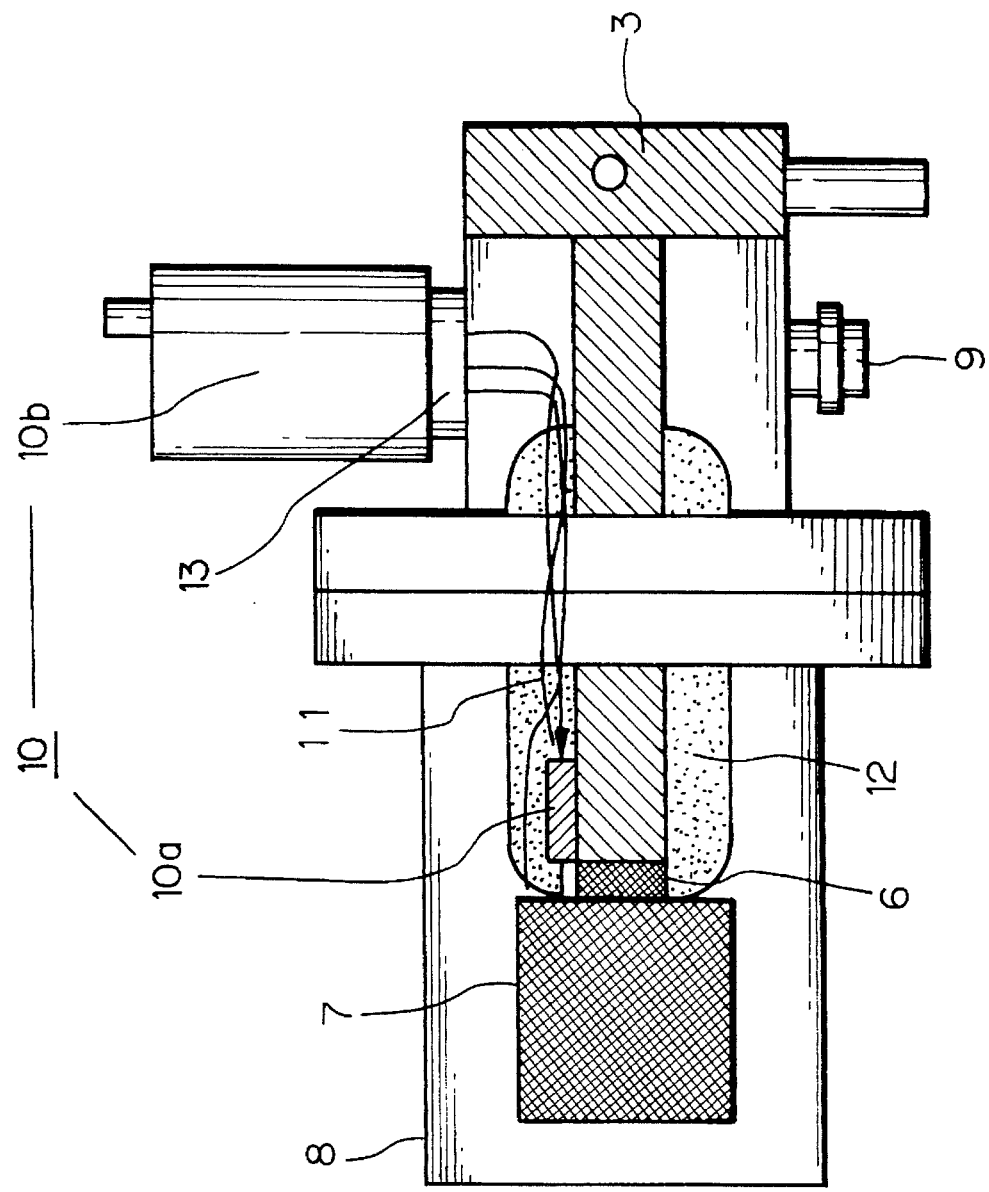
FIG. 5 illustrates the internal structure of the electric-cooled semiconductor radioactive ray detector according to the present invention shown in FIG. 3, wherein the first stage amplifier circuit 10a of a signal amplifier, said circuit 10a located adjacent to the semiconductor radioactive ray detecting element 7 as well as signal lines and circuit wiring 11 are covered and molded by fibrous material having gas permeability and electrical insulation property.

FIG. 5 illustrates the internal construction of the electric-cooled semiconductor radioactive ray detector shown in FIG. 3 according to the present invention wherein the first stage amplification circuit 10a of the signal amplifier which is located in the vicinity of the semiconductor radioactive ray detecting element 7, and the signal line and circuit wiring 11 are covered and molded by fibrous material having gas permeability and electric insulation property. In FIG. 5, the reference numerals same as those used in FIG. 3 designate those elements identical to those designated by the corresponding numerals. As shown in FIG. 5, the first stage amplification circuit 10a of the signal preamplifier 10 which is located in the vicinity of the semiconductor radioactive ray detecting element 7, and the signal line and circuit wiring 11 are covered and molded by the fibrous material 12 having gas permeability and electrical insulation property. Employment of such a construction as above in the present radioactive ray detector serves to suppress vibration at the input stage of the signal preamplifier 10, whereby a subtle change in the stray capacitance of the input circuit of the signal preamplifier 10 which is the major cause of generation of microphonics can be removed and thus microphonics can be reduced. Incidentally, the first stage amplification circuit 10a comprises an FET, a feedback resistor and a feedback capacitor.

FIG. 6 illustrates in detail one of the compression pump fixing mechanisms which is adapted to fix the compression pump 2 of the electric-cooled semiconductor radioactive ray detector according to the present invention as shown in FIG. 3 to the support base 15 by way of the vibration absorbing material 16. In FIG. 6, numeral 2 designates the compression pump, numeral 15 the support base, numerals 16 and 16' the vibration absorbing material, and numeral 17 the fixing jig respectively. Plate-like rubber or the like may be used as the vibration absorbing material 16 and 16'. As shown in FIG. 6, the vibration absorbing material 16 is placed between the bottom part of the compression pump 2 and the support base 15 with the compression pump 2 resting on the support base 15. The vibration absorbing material 16' is also placed at the top of the compression pump 2. One end of the band-like fixing jig 17 is secured to the support base 15 in such a manner as the central portion of the fixing jig pressing the vibration absorbing material 16' at the top of the compression pump 2 and the other end of the fixing jig 17 is secured also to the support base 15, whereby the compression pump 2 may be secured to the support base 15.

Operation of the electric-cooled semiconductor radioactive ray detector will nextly be explained. After the semiconductor radioactive ray detector element 7 has been cooled by the Stirling type electric refrigerator to the operating temperature thereof, the drive voltage and/or the frequency of the drive power supply 5 of the Stirling type electric refrigerator 1 are adjusted in such a range as the operable temperature of the semiconductor radioactive ray detecting element 7 may be maintained and the drive voltage and/or the frequency of the drive power supply 5 which gives least influence over the energy resolution due to the microphonics which are likely to be generated are selected and used. Since the vibrational operation of the Stirling type electric refrigerator 1 is varied by changing the drive voltage and/or the frequency of the drive power supply 5, the frequency spectra of the microphonics are also varied. Accordingly, it is normal practice to select the operational voltage and/or power supply frequency that are the best for the frequency spectra of the microphonics which improve the energy resolution of the semiconductor radioactive ray detector, and to use them for detecting radioactive rays.

As shown in FIGS. 3 and 6, since the compression pump 2 of the Stirling type electric refrigerator is fixed indirectly to the support base 15 which also supports the Stirling cycle cooling mechanism 3, by way of the vibration absorbing material 16 and 16' made of rubber plate or the like, the vibration absorbing materials 16 and 16' serve to absorb the vibration generated from the compression pump 2 so that the vibration will not be transmitted to the support base 15 nor the Stirling cycle cooling mechanism 3 and also the vibration will not be transmitted from the Stirling cycle cooling mechanism 3 to the semiconductor radioactive ray detecting element 7. Accordingly, microphonics which will be caused by the vibration generated from the compression pump 2 can be reduced.

Figure 7:
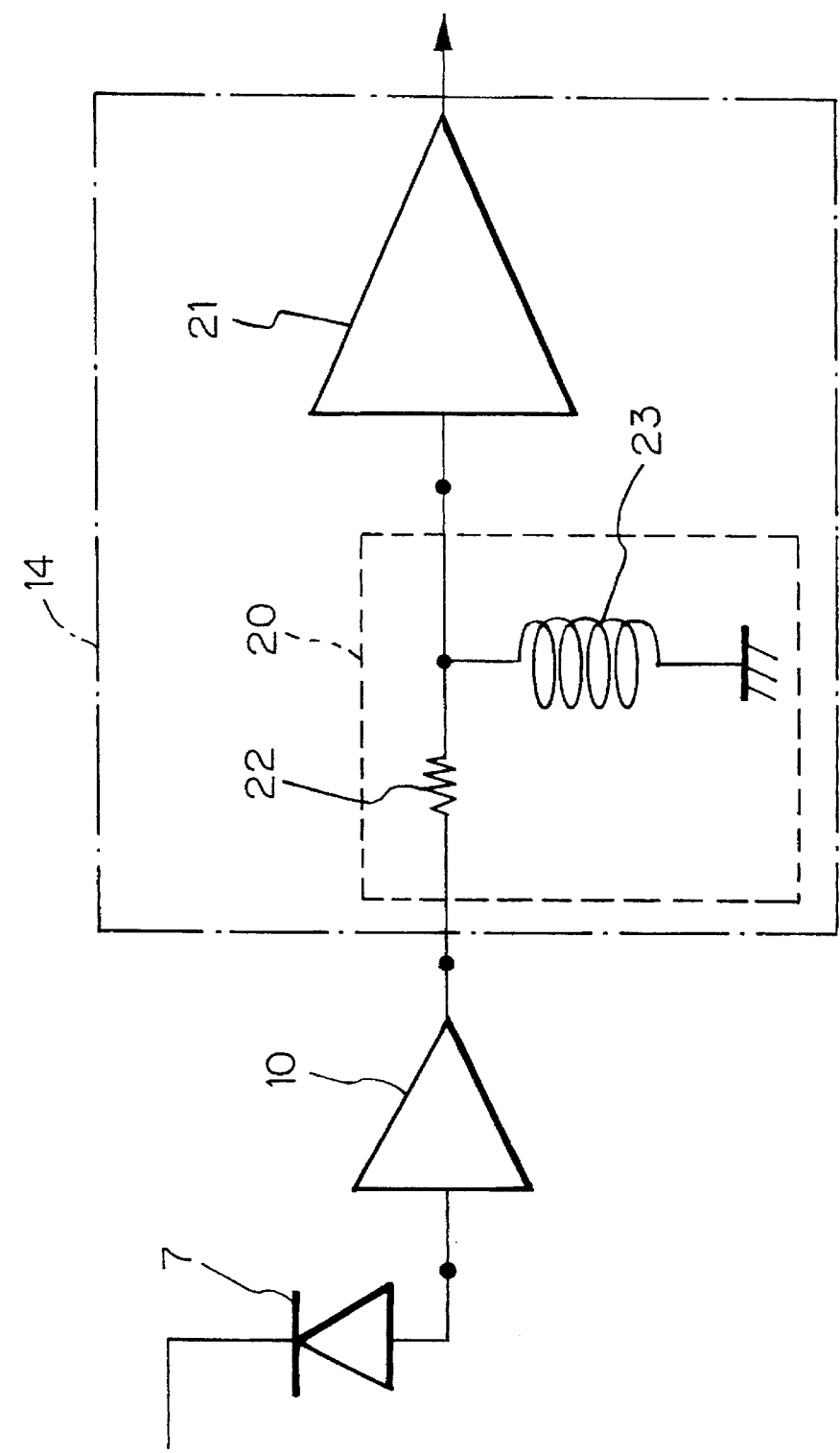
FIG. 7 illustrates the signal amplification system for the semiconductor radioactive ray detector according to the present invention which includes a microphonics removal circuit.

In consideration of the fact that the microphonics which are generated have a frequency less than 10 kHz, degradation of the energy resolution of the semiconductor radioactive ray detector due to microphonics can be prevented by using signal processing technology. FIG. 7 illustrates a signal amplification system for the semiconductor radioactive ray detector according to the present invention which includes the microphonics removal circuit. In FIG. 7, numeral 7 designates the semiconductor radioactive ray detecting element, numeral 10 the signal preamplifier, numeral 20 a noise reducing circuit which is incorporated in the main signal amplifier 14, and numeral 21 the main signal amplification stage of the main signal amplifier 14. It is to be noted that, for easy understanding, the signal line and circuit wiring 11 shown in FIG. 3 and interposed between the signal preamplifier 10 and the main signal amplifier 14 are omitted. The noise reducing circuit 20 comprises a resistor 22 connected in series between the output of the signal preamplifier 10 and the input of the main signal amplification stage 21, and a coil 23 connected in parallel to the signal transmission system between the connection point between the resistor 22 and the main signal amplification stage 21, and the ground.

The signals relating to the radioactive rays output from the semiconductor radioactive ray detecting element 7 are, after amplified by the signal preamplifier 10, inputted to the noise reducing circuit 20 which reduces noise having frequencies less than 10 kHz. The microphonics caused by the inherent vibration generated from the Stirling type electric refrigerator are reduced by the noise reducing circuit 20. The signals relating to the radioactive rays output from the noise reducing circuit 20 are caused to pass through a filter having a time constant of 1 microsecond to a few microseconds contained in the main signal amplification stage 21 of the main signal amplifier 14 and then amplified to be output as the signals for analysis of pulse heights.

Since the noise reducing circuit 20 is required to reduce the noise having frequencies less than 10 kHz without distortion of the signals relating to the radioactive rays, the circuit 20 is preferably consisted of one resistor 22 and one coil 23 as above explained.

Figure 8:
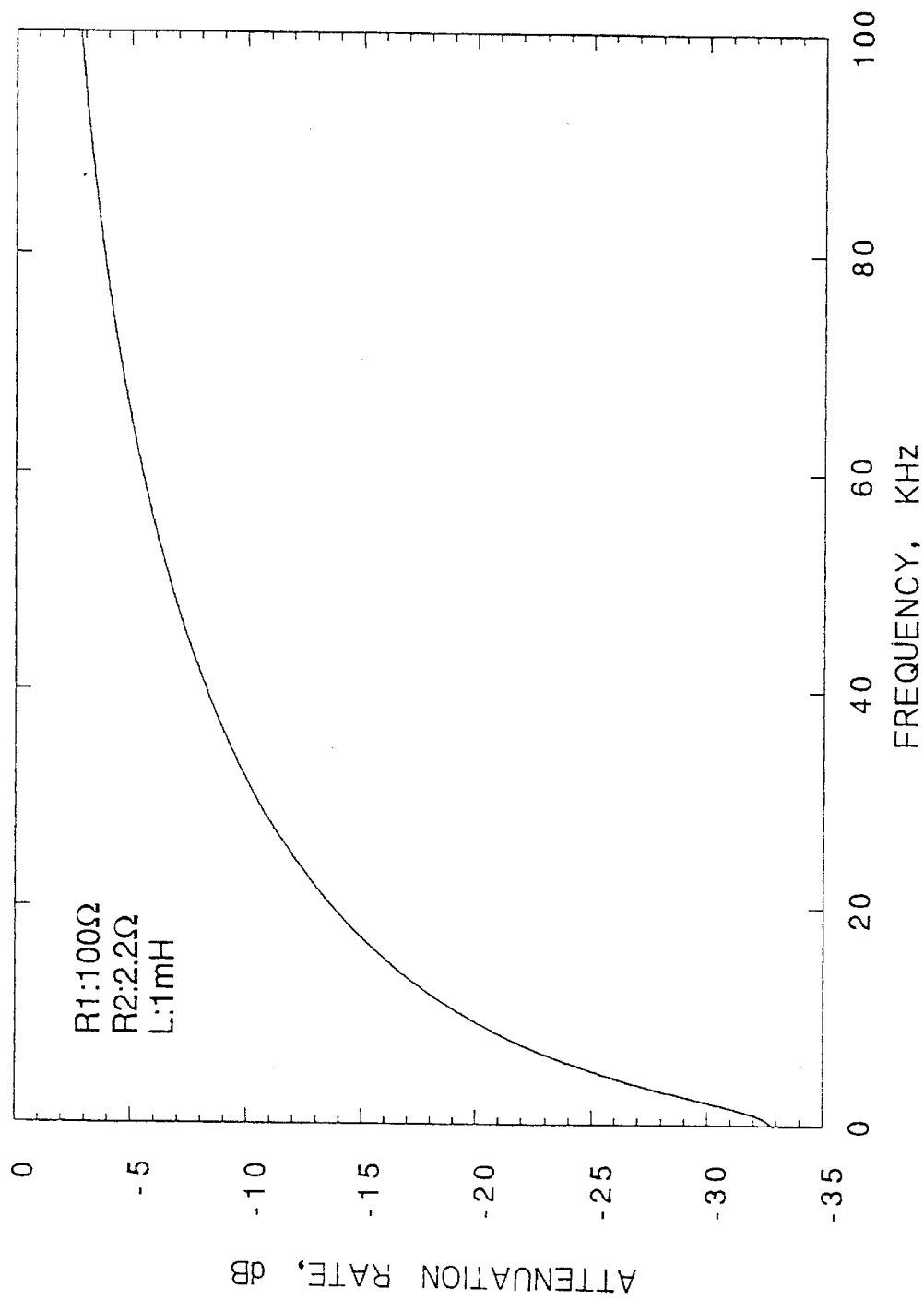
FIG. 8 illustrates attenuation characteristics of the noise reducing circuit shown in FIG. 7.

Attenuation by the noise reducing circuit 20 can be calculated in accordance with the following equation.

$$Y=(R_1/(R_1+R_2)) \cdot (1+f^2/(R_2/L)^2)^{1/2}/(1+f^2/((R_1+R_2)/L)^2)^{1/2}$$

where Y is the attenuation rate, $R_1$ the resistance value of the resistor 22, L the inductance value of the coil 23, $R_2$ the DC resistance value of the resistance component contained in the coil 23 and f the frequency. Assuming for example that $R_1$ is 100Ω, L 1 mH, $R_2$ 2.2Ω and the frequency varying from 0 to 100 kHz, the variation of the attenuation rate is as shown in FIG. 8. This circuit has the characteristic that the level is gradually attenuated from the frequency range (1 MHz) of the signals relating to radioactive rays and abruptly attenuated from the vicinity of 10 kHz which is a range where noise is generated in the Stirling type radioactive ray detector, whereby the noise level can be reduced to the level substantially equivalent to that of a conventional liquid nitrogen cooling type.

An embodiment in which the construction shown in FIG. 3 has been implemented will next be explained. A Ge gamma ray detecting element of a closed-end type having a diameter of 32 mm, a length of 20 mm and a volume of 15 cm³ was used as the semiconductor radioactive ray detecting element 7 and ORTEC-120 type preamplifier was used as the signal preamplifier 10.

The Stirling type electric refrigerator 1 having a cooling capacity 1.5 W (as of liquid nitrogen) operable at the maximum operational rating of AC 11 V 6.5 A was used for cooling.

Figure 9:
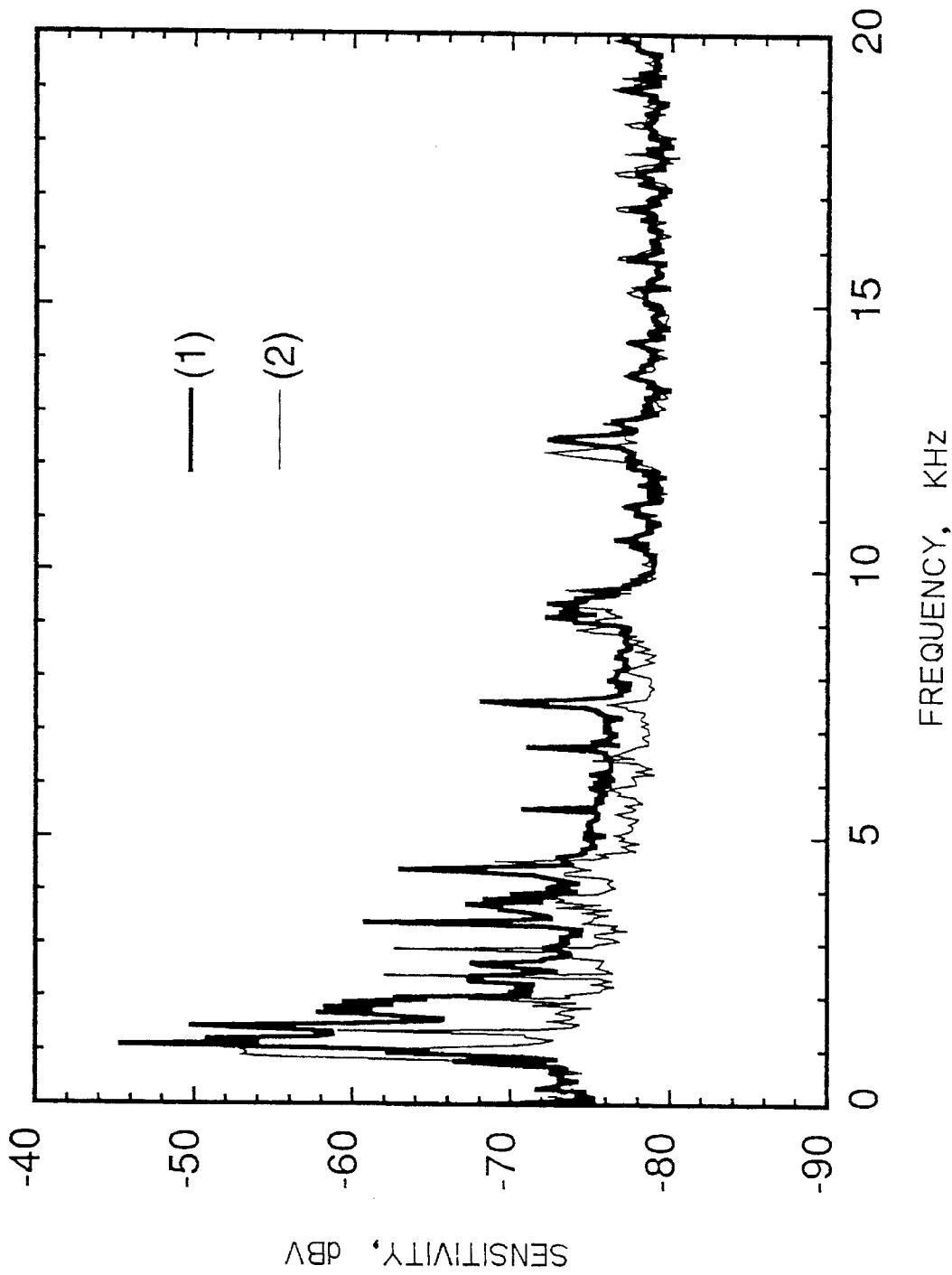
FIG. 9 illustrates an example of analysis by means of a spectral analyzer of microphonics generated before and after the molding was executed.

The fibrous material called "Bencot" under the commodity name was used as the fibrous material 12 having gas permeability and electric insulation properties used for covering and molding the first stage amplification circuit 10a of the signal preamplifier 10 which is located in the vicinity of the semiconductor radioactive ray detecting element 7, and the signal line and circuit wiring 11 in the semiconductor radioactive ray detector. Microphonics were attenuated by this arrangement. A little bit more time is required for evacuating the interior of the semi-conductor radioactive ray detector in order to attain a specified vacuum degree which was eventually attained almost equivalently compared to the case of not providing microphonics attenuation as above described. An example is shown in FIG. 9 that microphonics which were generated before and after the above-mentioned molding was executed were analyzed with a spectrum analyzer. In FIG. 9, (1) indicates the microphonics level before molding was executed as mentioned above and shows that, in a frequency range of less than 10 kHz, particularly at the range near 1 kHz–2 kHz, the signals indicate extremely high level of microphonics, while (2) indicates microphonics level after molding and shows that the signals indicate a rather lower level of microphonics up to the vicinity of 10 kHz compared to (1).

Figure 10:
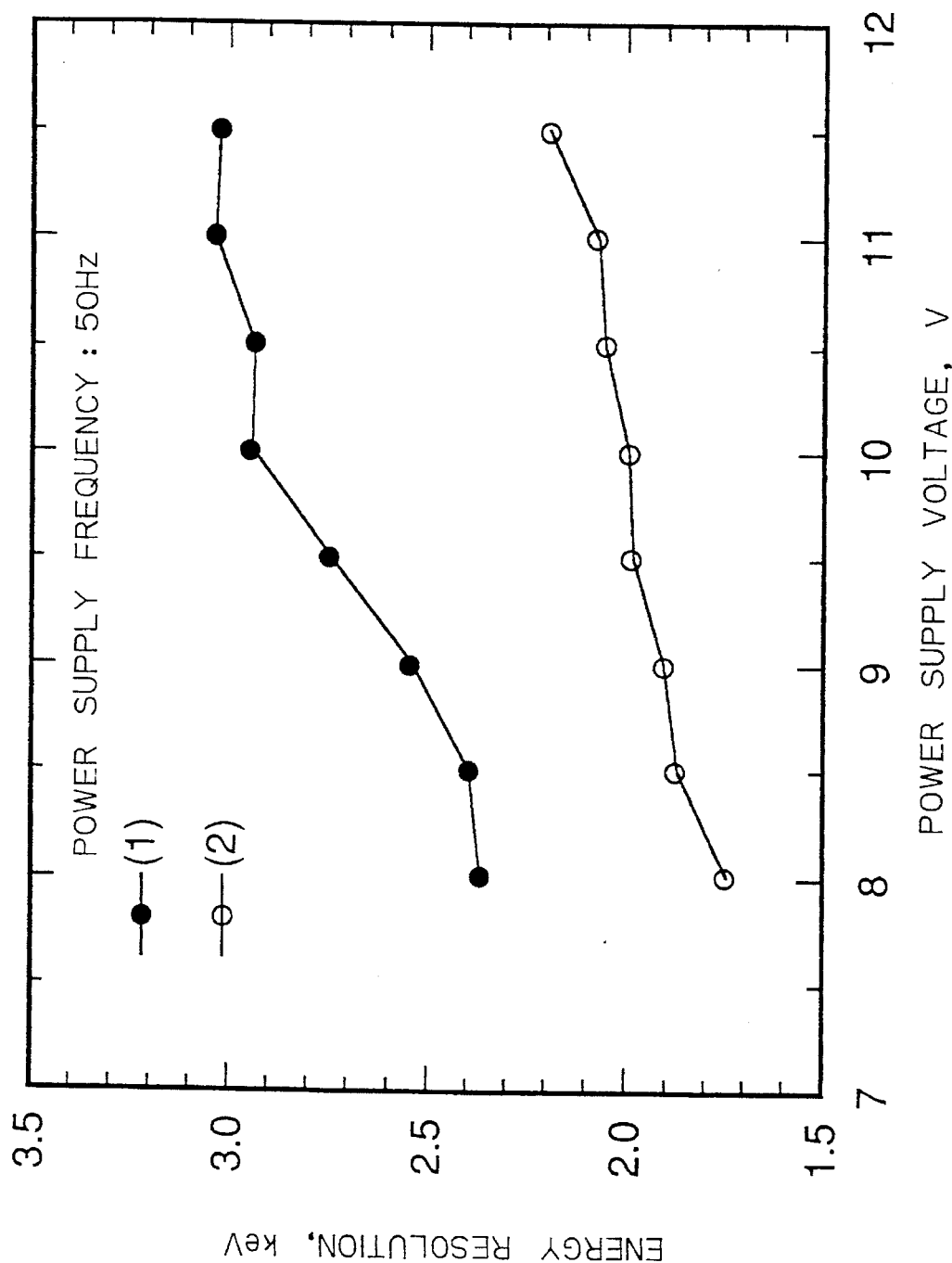
FIG. 10 illustrates the energy resolution characteristics when the drive voltage for the electrical refrigerator of the semiconductor radioactive ray detector according to the present invention has been varied from 11.5 V to 8 V.

The semiconductor radioactive ray detecting element 7 was cooled to the operational temperature thereof by supplying AC 11V 6.5A or the maximum rating of the Stirling type electric refrigerator 1 from the drive power supply 5. Subsequently, the drive voltage for the Stirling type electric refrigerator 1 was changed within the range in which the operable temperature of the semiconductor radioactive ray detecting element 7 might be kept so as to search the drive voltage which has the least influence over the energy resolution due to microphonics which are likely to be generated. FIG. 10 illustrates the energy resolution characteristics when the drive voltage was changed from 11.5 V to 8 V. In FIG. 10, (1) designates the full width half maximum energy resolution characteristics for 1.33 MeV gamma ray emitted from $^{60}$Co standard gamma ray source, and (2) designates the full width half maximum energy resolution characteristics for pulser showing the performance only of the amplification system. It was confirmed that as the voltage was lowered, the energy resolution in both cases was improved. Under the condition that these characteristics and the cooling temperature are not lowered considerably, the drive voltage of the Stirling type electric refrigerator 1 was selected to be 9 V in the case of the present semiconductor radioactive ray detector.

Figure 11:
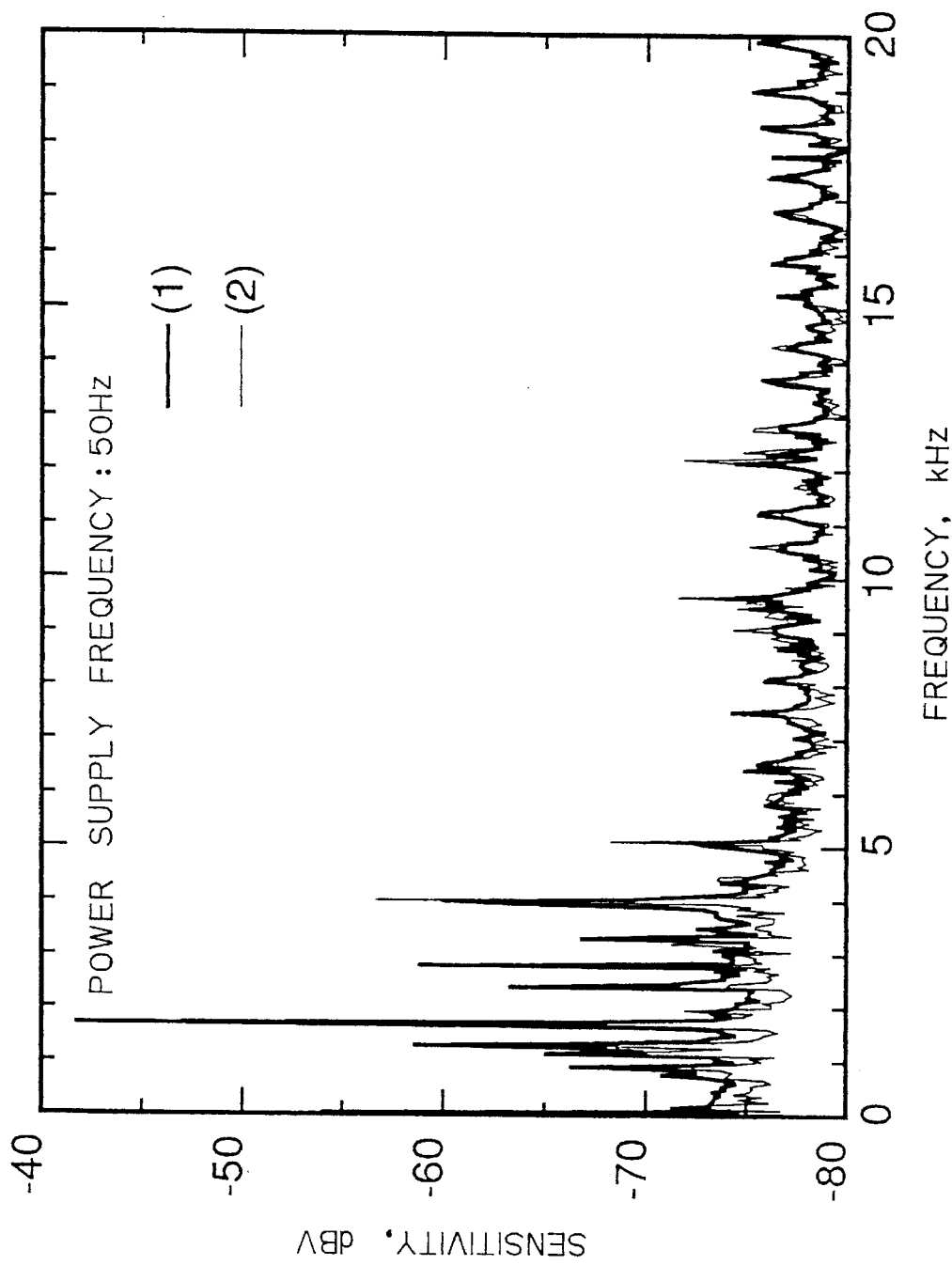
FIG. 11 illustrates an example of comparison of spectra of microphonics in the case that the drive voltage for the electric refrigerator of the semiconductor radioactive ray detector according to the present invention is 11 V and 9 V respectively.

FIG. 11 illustrates comparison of microphonic spectra in the cases of the drive voltage being 11 V and 9 V. In FIG. 11, (1) designates the case of the drive voltage being 9 V and (2) designates the case of the drive voltage being 11 V. It is confirmed from FIG. 11 that the microphonics spectra in the case of the drive voltage being 9 V compared to those of the drive voltage being 11 V have lower frequency component as well as lower noise level, so that the energy resolution can be improved if the drive voltage is lowered.

Figure 12:
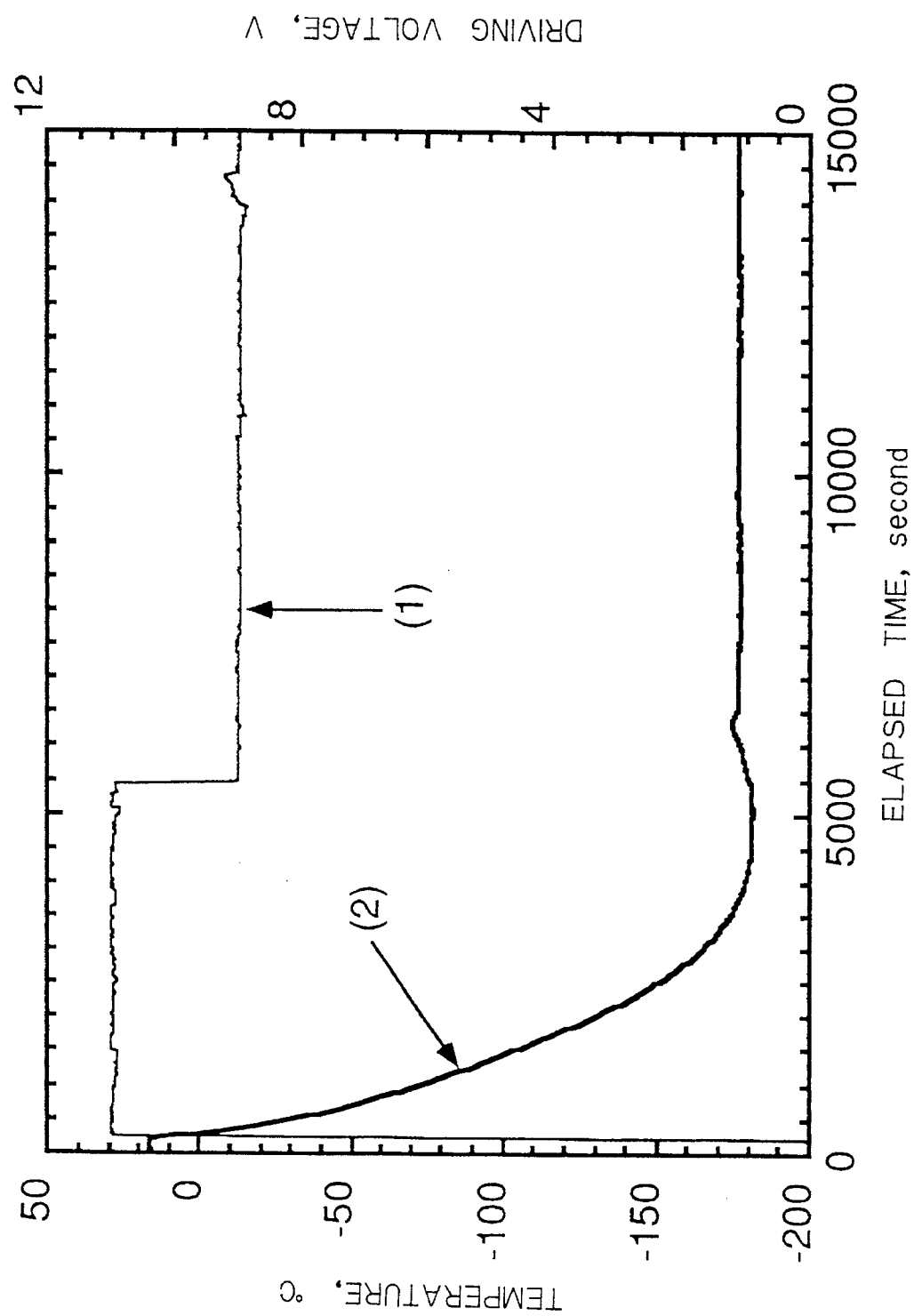
FIG. 12 illustrates a typical cooling operation of the semiconductor radioactive ray detector according to the present invention.

Typical cooling operation of a semiconductor radioactive ray detector as determined based on the abovementioned comparison is shown in FIG. 12. In FIG. 12, (1) designates the drive voltage and (2) designates the cooling temperature.

Figure 13:
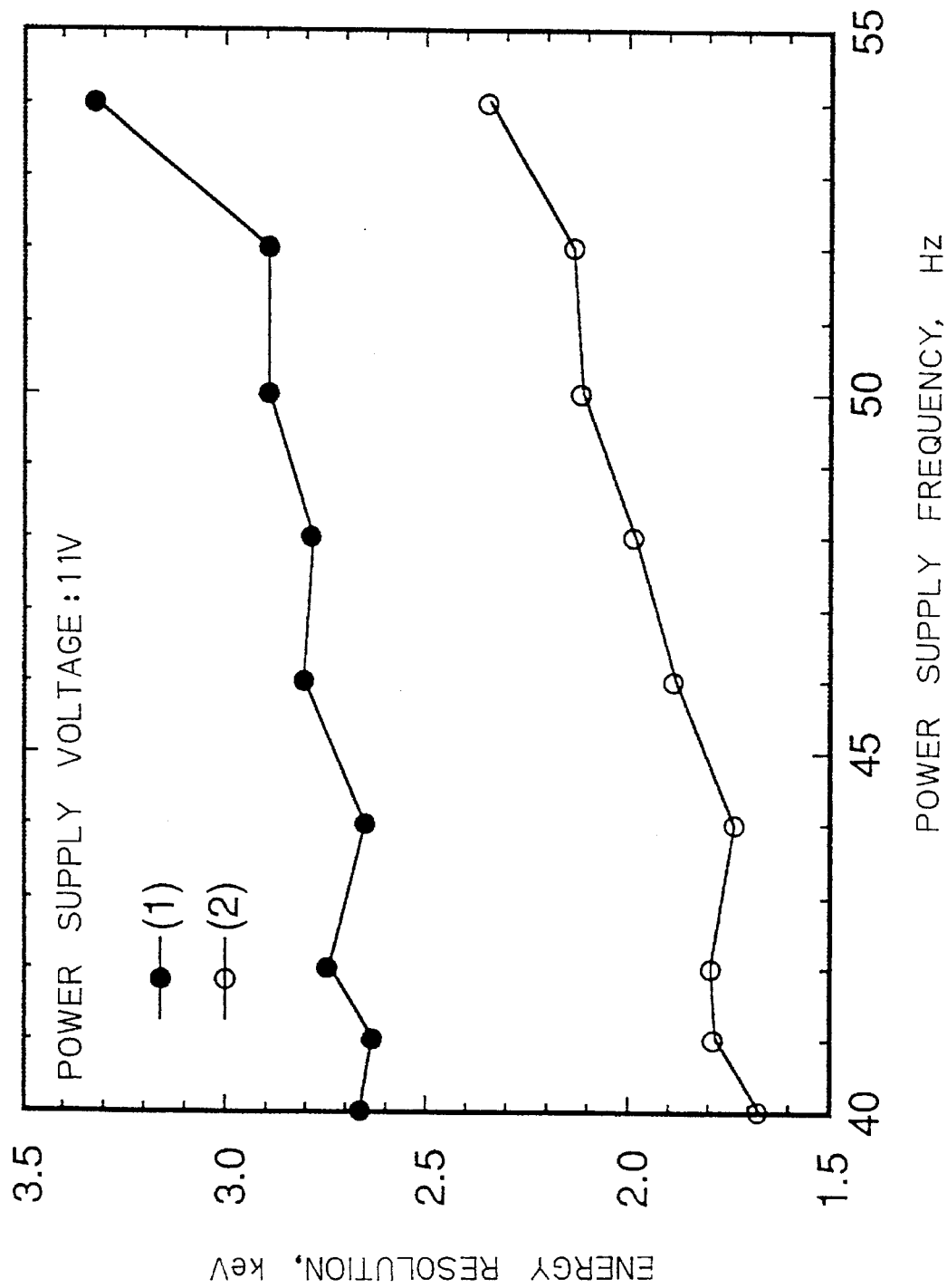
FIG. 13 illustrates the results of measurement of the power supply frequency which has the least influence over the energy resolution by the microphonics generated by adjusting the power supply frequency when the voltage of a drive power supply 5 of the semiconductor radioactive ray detector according to the present invention shown in FIG. 3 is fixed at 11.0 V.

The result of measurement of the power supply frequency which has the least influence over the energy resolution due to microphonics generated by fixing the voltage of the drive power supply 5 at 11.0 V and adjusting the power supply frequency is shown in FIG. 13. In FIG. 13, (1) designates the characteristics of the full width half maximum energy resolution for 1.33 MeV gamma ray emitted from $^{60}$Co standard gamma ray source, and (2) designates the characteristics of the full width half maximum energy resolution for a pulser, showing the performance only of the amplification system. It can be seen from FIG. 13 that as the power supply frequency was lowered, the energy resolution was improved in both cases. Therefore it could be confirmed from the result shown in FIG. 13 that the frequency around 42 Hz is optimal for the semiconductor radioactive ray detector according to the present embodiment.

Figure 14:
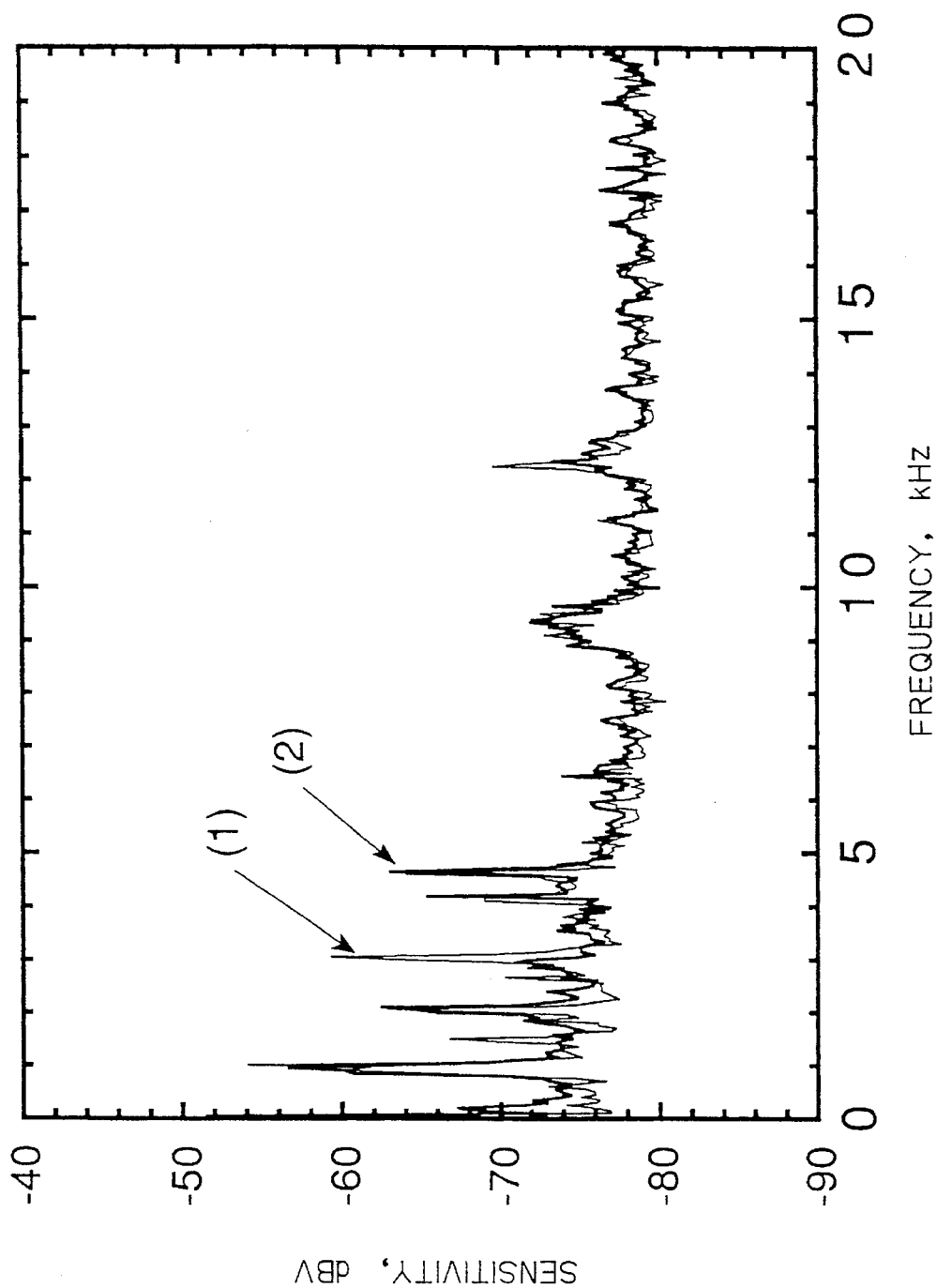
FIG. 14 illustrates spectra of microphonics frequency obtained by methods of reducing microphonics by varying the drive voltage and of reducing microphonics by varying drive power supply frequency.

FIG. 14 illustrates the frequency spectra of the microphonics by the method of reducing the microphonics by varying the drive voltage and the method of reducing the microphonics by varying the drive power supply frequency. In FIG. 14, (1) designates the method of varying the drive voltage and (2) designates the method of varying the drive power supply frequency. As the result of comparison between the method of reducing the microphonics by varying the drive voltage and the method of reducing the microphonics by reducing the drive power supply frequency, almost equivalent results were obtained. This is because the frequency spectra of the microphonics in both cases are substantially same.

Figure 15:
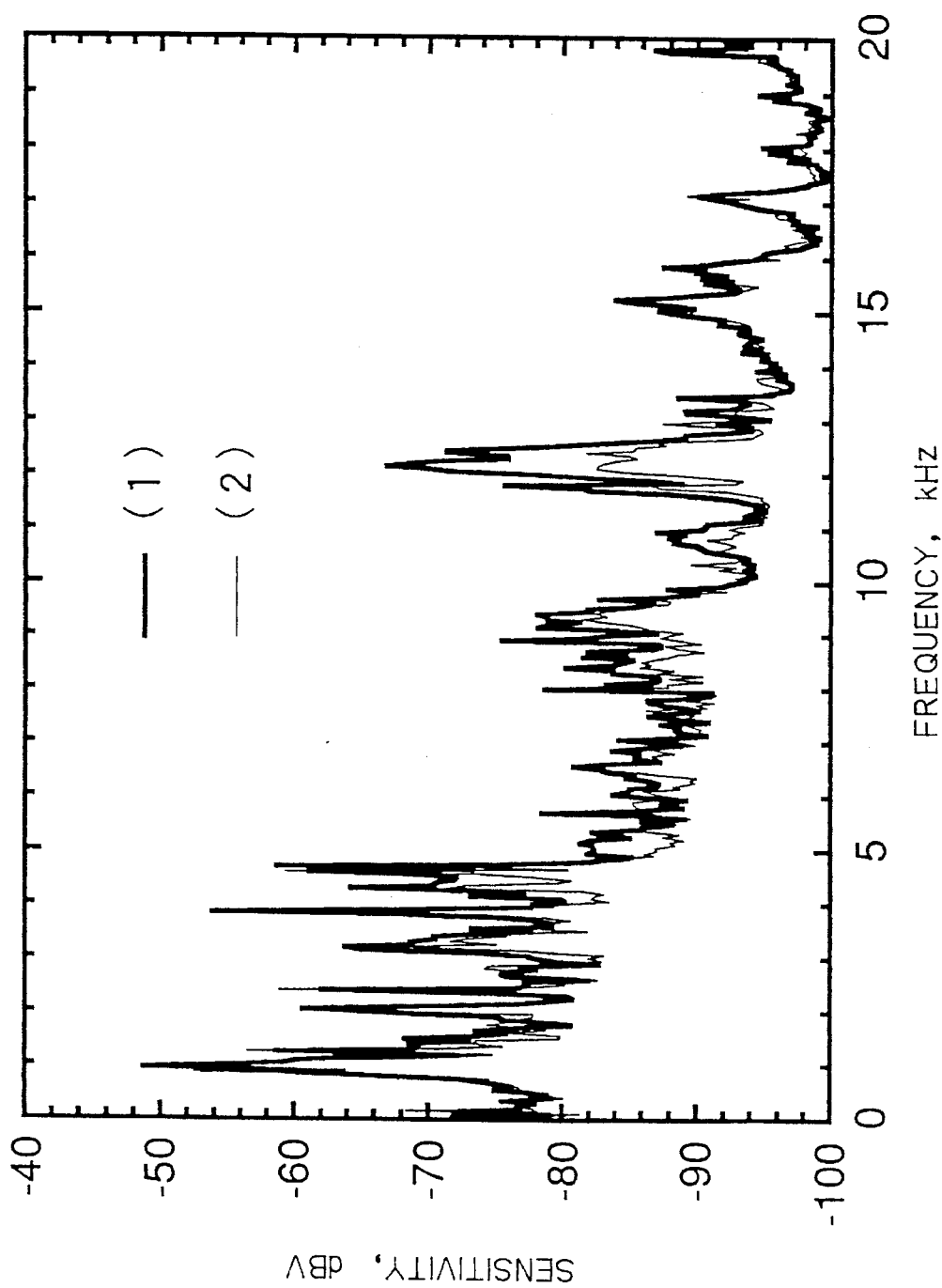
FIG. 15 illustrates spectra of microphonics frequency obtained respectively when the compression pump 2 shown in FIG. 3 is directly fixed to the support base 15 and the compression pump 2 is indirectly fixed to the support base 15 by use of a plate rubber as the vibration absorbing material 16 for absorbing vibration.

In the case that the compression pump 2 of the Stirling type electric refrigerator is fixed directly to the support base 15, it was confirmed that the microphonics were considerably generated around 12 kHz as the frequency components thereof as shown in (1) of FIG. 15. For this reason, in order to reduce the influence over the energy resolution by the vibration noise, plate-like rubber was used as the vibration absorbing material 16 and 16' so as to fix the compression pump 2 indirectly to the support base 15, as shown in FIG. 6. As a result, microphonics caused by the vibration generated by the compression pump 2 could be reduced as shown by (2) in FIG. 15. This reduction in microphonics improved the full width half maximum resolution by 0.2 keV.

Figure 16:
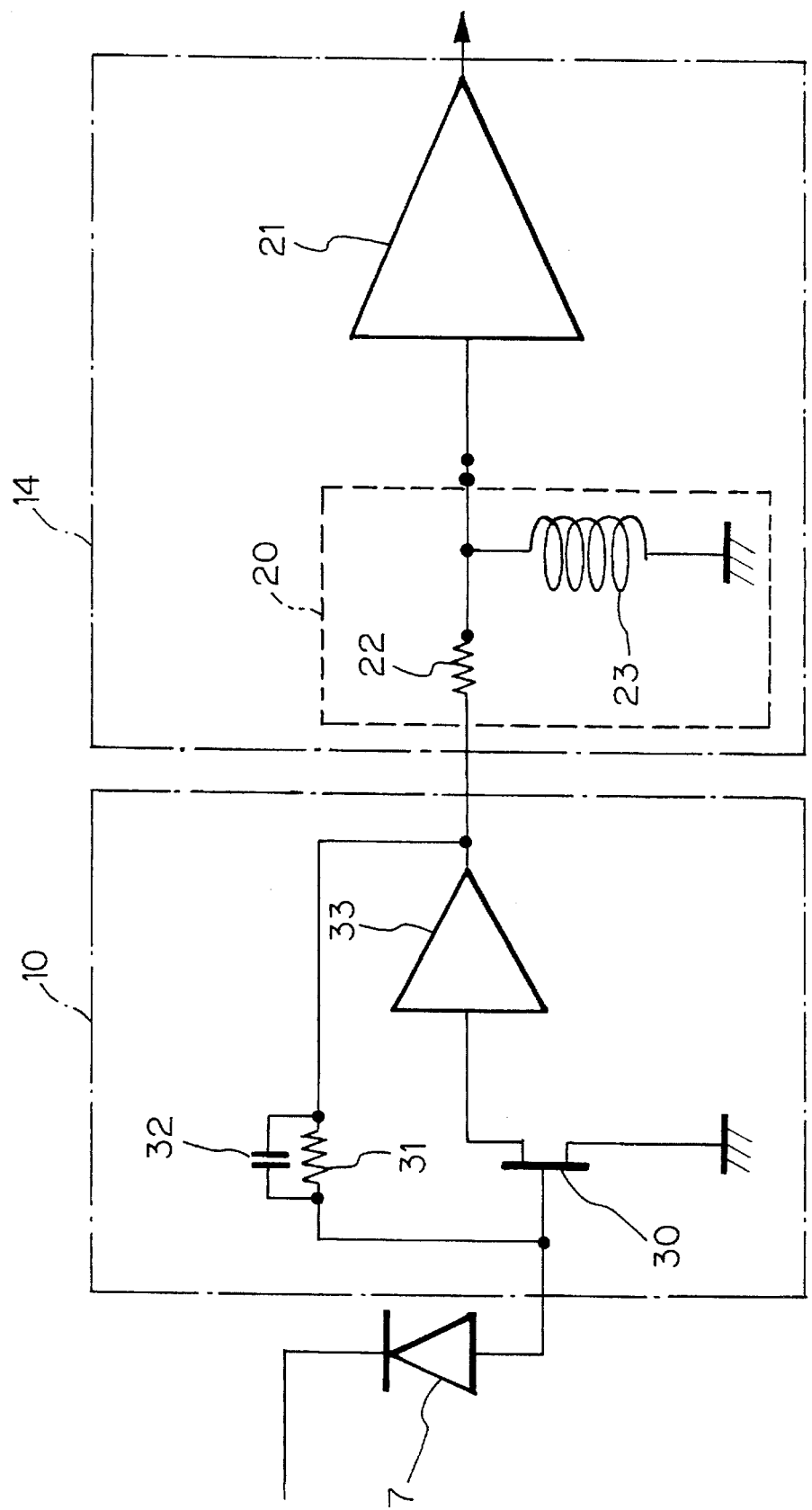
FIG. 16 illustrates an embodiment of the constitution in detail of the signal amplification system for the semiconductor radioactive ray detector which includes the noise reducing circuit shown in FIG. 7 for reducing microphonics.

An embodiment of the detailed constitution of the signal amplification system for the semiconductor radioactive ray detector including the noise reducing circuit for the microphonics shown in FIG. 7 will next be explained. In FIG. 16, reference numerals which are the same as in FIG. 7 designate the same elements indicated by those corresponding numerals in FIG. 7. In FIG. 16, reference numeral 30 designates an FET, numeral 31 a feedback resistor, numeral 32 a feedback capacitor, and numeral 33 a phase inverting amplifier respectively and these components constitute the signal preamplifier 10 which is the charge amplifying type amplification circuit. The reason of employment of the feedback system as shown in FIG. 16 is to reduce the output impedance of the signal preamplifier 10. For the resistance value $R_1$ of the resistor 22 for the noise reducing circuit 20 and the inductance value L as well as the DC resistance value $R_2$ of the coil 23, the constant as earlier described were used, or $R_1$=100Ω, $R_2$=2.2Ω and L=1 mH.

After the signals relating to the radioactive rays output from the noise reducing circuit 20 are passed through the filter (not shown) of CANBERRA-2021 type having a time constant of 1 microsecond, the signals are amplified by the main signal amplification stage 21 and output. The signals which are amplified and output are analyzed by a multichannel pulse height analyzer (not shown) to obtain gamma ray spectra.

Figure 17:
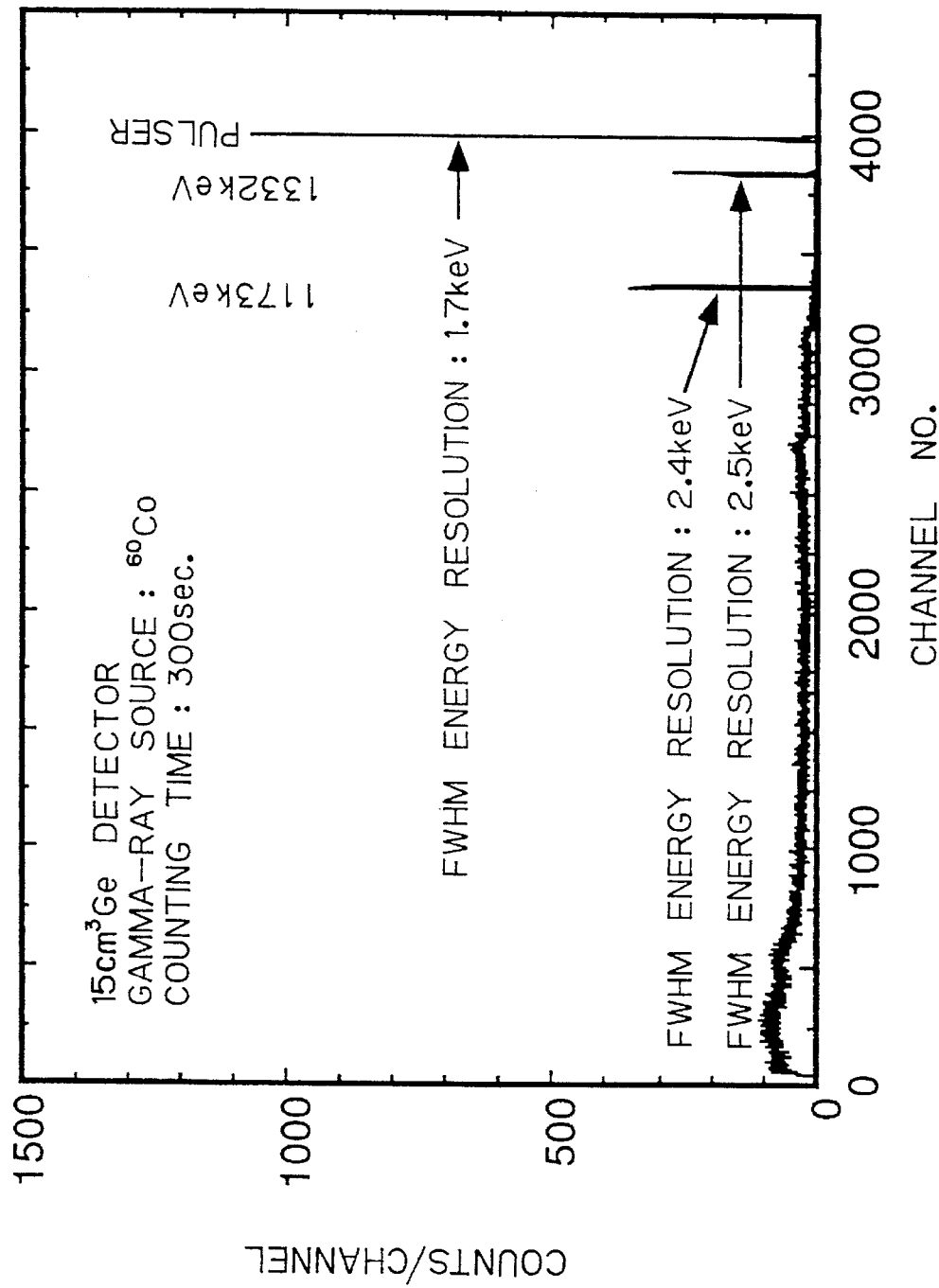
FIG. 17 illustrates spectra of gamma ray obtained by measuring a standard gamma ray source of $^{60}CO$ by using the electric-cooled semiconductor radioactive ray detector shown in FIG. 3.

The gamma ray spectra obtained by measuring $^{60}$Co standard gamma ray source by using the electric-cooled semiconductor radioactive ray detector according to the embodiment described above are shown in FIG. 17. The energy resolution which is critical for the performance of the Ge gamma ray detector is 3.4 keV for 1.3 MeV gamma ray and 2.8 keV for the pulser if the microphonics reduction means according to the present invention is not employed. However, the energy resolution, if the microphonics reducing means according to the present invention is employed, has been improved to 2.5 keV for 1.3 MeV gamma ray and 1.7 keV for the pulser respectively. The energy resolution measured at the same measuring conditions as mentioned above by stopping the Stirling type electric refrigerator for a short period of time was 2.3 keV for 1.3 MeV and 1.6 keV for the pulser respectively. Accordingly, by employing the method of reducing microphonics according to the present invention, an electric-cooled Ge semiconductor radioactive detector which has substantially same energy resolution as that of the liquid nitrogen type Ge gamma ray detector could be realized.

Although the present invention has been described by referring in detail to certain preferred embodiments, further changes and modifications of the present invention are apparently feasible within the true spirit and scope of the present invention.

What is claimed is:

1. An electric-cooled semiconductor radioactive ray detector, comprising:

a vacuum vessel;

a semiconductor radioactive ray detecting means disposed in said vacuum vessel;

an electrical cooling means mechanically coupled to said semiconductor radioactive ray detecting means and including a Stirling type electric refrigerator for cooling by cyclic operation; and a microphonics reducing means for passing therethrough signals relating to the detected radioactive rays and reducing microphonics so as to prevent microphonics generated by the semiconductor radioactive ray detecting means as a result of said Stirling type electric refrigerator from having an adverse influence on the energy resolution.

2. An electric-cooled semiconductor radioactive ray detector as claimed in claim 1 wherein said electrical cooling means includes a voltage variable power supply capable of selecting a drive voltage for driving said electrical cooling means which exerts the least influence of generated microphonics over the energy resolution.

3. An electric-cooled semiconductor radioactive ray detector as claimed in claim 2 wherein said voltage variable power supply is a frequency variable power supply capable of selecting the frequency of said voltage variable power supply which exerts the least influence of generated microphonics over the energy resolution.

4. An electric-cooled semiconductor radioactive ray detector as claimed in claim 1 wherein said electrical cooling means includes a frequency variable power source capable of selecting a frequency of a drive voltage for driving said electrical cooling means which exerts the least influence of generated microphonics over the energy resolution.

5. An electric-cooled semiconductor radioactive ray detector as claimed in claim 1 wherein said Stirling type electric refrigerator includes a drive power supply, a compression pump means driven under power from the drive power supply for generating gas, and a Stirling cycle cooling mechanism for cooling the semiconductor radioactive ray detecting means by the gas generated by said compression pump means, and a vibration absorbing member, wherein said compression pump means is indirectly fixed to a support base supporting said Stirling cycle cooling mechanism by said vibration absorbing member.

6. An electric-cooled semiconductor radioactive ray detector as claimed in claim 1 wherein said microphonics reducing means includes at least one resistor connected between the signal input terminal and the signal output terminal thereof and at least one coil connected between said output terminal and the common line of said microphonics reducing means.

7. An electric-cooled semiconductor radioactive ray detector comprising:

a vacuum vessel, a semiconductor radioactive ray detecting means disposed in said vacuum vessel, and including a semiconductor radioactive ray detector, an amplification means for amplifying signals generated from said semiconductor radioactive ray detector, a signal take-out means for taking out of said vacuum vessel the signals amplified by said amplification means, and a circuit wiring means for feeding power to and controlling said semiconductor radioactive ray detecting means, wherein said amplification means, said signal take-out means and said circuit wiring means are covered and molded by fibrous material having gas permeability and electric insulation properties; and an electrical cooling means mechanically coupled to said semiconductor radioactive ray detecting means and including a Stirling type electric refrigerator for cooling by cyclic operation and a voltage variable power supply capable of selecting a drive voltage for driving said electrical cooling means which exerts the least influence of generated microphonics over the energy resolution.

8. An electric-cooled semiconductor radioactive ray detector as claimed in claim 7 wherein said voltage variable power supply is a frequency variable power supply capable of selecting the frequency of said voltage variable power supply which gives the least influence of the microphonics over the energy resolution.

9. An electric-cooled semiconductor radioactive ray detector as claimed in claim 7 wherein said Stirling type electric refrigerator includes a drive power supply, a compression pump means driven by the power from said drive power supply for generating gas, a Stirling cycle cooling mechanism for cooling said semiconductor radioactive ray detecting means by the gas generated from said compression pump means, and a vibration absorbing member, wherein said compression pump means is fixed indirectly to a support base supporting said Stirling cycle cooling mechanism by the vibration absorbing member.

10. An electric-cooled semiconductor radioactive ray detector comprising:

a vacuum vessel, a semiconductor radioactive ray detecting means disposed in said vacuum vessel, and including a semiconductor radioactive ray detector, an amplification means for amplifying signals generated from said semiconductor radioactive ray detector, a signal take-out means for taking out of said vacuum vessel the signals amplified by said amplification means, and a circuit wiring means for feeding power to and controlling said semiconductor radioactive ray detecting means, wherein said amplification means, said signal take-out means and said circuit wiring means are covered and molded by fibrous material having gas permeability and electric insulation properties, and an electrical cooling means mechanically coupled to said semiconductor radioactive ray detecting means and including a Stirling type electric refrigerator for cooling by cyclic operation and a frequency variable power supply capable of selecting the frequency of a drive voltage tier driving said electrical cooling means which exerts the least influence of generated microphonics over the energy resolution.

11. An electric-cooled semiconductor radioactive ray detector as claimed in claim 10 wherein said Stirling type electric refrigerator includes a drive power supply, a compression pump means driven by the power from said drive power supply for generating gas, a Stirling cycle cooling mechanism for cooling said semiconductor radioactive ray detecting means by the gas generated from said compression pump means, and a vibration absorbing member, wherein said compression pump means is fixed indirectly to a support base supporting said Stirling cycle cooling mechanism by the vibration absorbing member.

12. An electric-cooled semiconductor radioactive ray detector comprising:

a vacuum vessel;

a semiconductor radioactive ray detecting means including
- a semiconductor radioactive ray detecting element disposed within said vacuum vessel,
- a signal preamplifier for amplifying signals generated by said semiconductor radioactive ray detecting element, said signal preamplifier including
  - a first stage amplification circuit disposed within said vacuum vessel and proximate to said semiconductor radioactive ray detecting element, and electrically connected through a signal line to said semiconductor radioactive ray detecting element, and
  - a subsequent stage amplification circuit disposed outside of said vacuum vessel,
- signal lines connecting said first stage amplification circuit and said subsequent stage amplification circuit, and
- circuit wiring means for feeding power to and controlling said semiconductor radioactive ray detecting means, wherein said first stage amplification circuit, said signal lines and said circuit wiring means are covered and molded by fibrous material having gas permeability and electric insulation properties; and an electrical cooling means mechanically coupled to said semiconductor radioactive ray detecting element and including a Stirling type electric refrigerator for cooling by cyclic operation.

13. An electric-cooled semiconductor radioactive ray detector as claimed in claim 12 wherein said signal preamplifier is a charge amplifying type amplification circuit, said first stage amplification circuit includes a FET, a feedback resistor and a feedback capacitor, said signal lines include a first signal line for feeding a signal from said FET to said subsequent stage amplification circuit, and a second signal line for feeding a signal back from said subsequent stage amplification circuit to said feedback resistor and said feedback capacitor.

14. An electric-cooled semiconductor radioactive ray detector as claimed in claim 13 wherein said Stirling type electric refrigerator includes
- a drive power supply,
- a compression pump means, driven by power supplied by said drive power supply, for generating gas,
- a Stirling cycle cooling mechanism for cooling said semiconductor radioactive ray detecting element with the gas generated by said compression pump means, wherein said Stirling cycle cooling mechanism and said vacuum vessel are directly fixed to a support base, and
- a vibration absorbing member for indirectly fixing said compression pump means to said support base, and said electrical cooling means includes a cooling section, disposed in said vacuum vessel, mechanically coupled directly to said Stirling cycle cooling mechanism, and coupled directly to said semiconductor radioactive ray detecting element, for cooling said semiconductor radioactive ray detecting element.

* * * * *